(12) United States Patent
Turnis et al.

(10) Patent No.: US 9,026,255 B2
(45) Date of Patent: May 5, 2015

(54) VALVE CONTAMINATION DISLODGEMENT

(75) Inventors: Justin J. Turnis, Manchester, IA (US); Bryan D. Christy, Asbury, IA (US)

(73) Assignee: Deere & Company, Moline, IL (US)

( * ) Notice: Subject to any disclaimer, the term of this patent is extended or adjusted under 35 U.S.C. 154(b) by 124 days.

(21) Appl. No.: 13/545,582

(22) Filed: Jul. 10, 2012

(65) Prior Publication Data

US 2014/0018964 A1 Jan. 16, 2014

(51) Int. Cl.
*G06F 19/00* (2011.01)
*G05D 7/06* (2006.01)
*F01P 7/04* (2006.01)
*F15B 20/00* (2006.01)
*F15B 21/04* (2006.01)

(52) U.S. Cl.
CPC .............. *G05D 7/0617* (2013.01); *F01P 7/044* (2013.01); *F15B 20/008* (2013.01); *F15B 21/042* (2013.01); *F15B 2211/20538* (2013.01); *F15B 2211/50518* (2013.01); *F15B 2211/513* (2013.01); *F15B 2211/5156* (2013.01); *F15B 2211/5159* (2013.01); *F15B 2211/526* (2013.01); *F15B 2211/611* (2013.01); *F15B 2211/62* (2013.01); *F15B 2211/6313* (2013.01); *F15B 2211/6336* (2013.01); *F15B 2211/7058* (2013.01); *F15B 2211/851* (2013.01); *F15B 2211/857* (2013.01); *F15B 2211/8636* (2013.01); *F15B 2211/87* (2013.01); *F15B 2211/875* (2013.01)

(58) Field of Classification Search
USPC ..................... 700/282, 276; 60/456, 493, 468
See application file for complete search history.

(56) References Cited

U.S. PATENT DOCUMENTS

| | | | |
|---|---|---|---|
| 4,167,455 A * | 9/1979 | Bard | 203/2 |
| 4,280,524 A | 7/1981 | Beimgraben | |
| 5,308,989 A * | 5/1994 | Brubaker | 250/441.11 |
| 6,003,455 A * | 12/1999 | Flamme et al. | 111/200 |
| 7,937,938 B2 * | 5/2011 | Kuipers et al. | 60/456 |

OTHER PUBLICATIONS

Background Information (1 page)(prior art before Jul. 10, 2012).

* cited by examiner

*Primary Examiner* — Kidest Bahta

(57) ABSTRACT

An apparatus comprises a fluid circuit comprising a fluid actuator and a valve operable to control an operational parameter associated with the fluid actuator, a sensor positioned to sense the operational parameter and to generate a parameter signal indicative of the operational parameter, and an electronic control system coupled electrically to the valve and the sensor. The control system is configured to override a setpoint control signal by outputting a dislodgement control signal to oscillate the valve to attempt to dislodge contamination that may have collected in the valve. An associated method is disclosed.

15 Claims, 3 Drawing Sheets

VALVE CONTAMINATION DISLODGEMENT

FIELD OF THE DISCLOSURE

The present disclosure relates to control of a valve.

BACKGROUND OF THE DISCLOSURE

There are work machines that have a cooling fan to cool fluids of the machine. In some cases, the hydraulic circuit for driving the fan has a proportional pressure-relief valve to control the speed of the fan. Contamination has become lodged in the valve causing the spool thereof to stick open, preventing the fan from increasing to a desired speed of rotation and thereby causing the machine to over-heat due to insufficient cooling by the cooling fan. This has resulted in machine downtime and decreased productivity. The contamination has been dislodged from the valve by human intervention to restore valve functionality.

SUMMARY OF THE DISCLOSURE

According to an aspect of the present disclosure, an apparatus comprises a fluid circuit comprising a fluid actuator and a valve operable to control an operational parameter associated with the fluid actuator, a sensor positioned to sense the operational parameter and to generate a parameter signal indicative of the operational parameter, and an electronic control system coupled electrically to the valve and the sensor. The control system is configured to output a setpoint control signal to the valve to target that the operational parameter achieve a setpoint, receive the parameter signal, determine if the operational parameter satisfies predetermined threshold standard based at least partially on the setpoint, and, if not, override the setpoint control signal by outputting a dislodgement control signal that is independent of any setpoint for the operational parameter and causes the valve to oscillate between at least a partially opened position and at least a partially closed position to attempt to dislodge contamination that may have collected in the valve. As such, restoration of valve functionality is promoted without human intervention, promoting uptime and productivity. An associated method is disclosed.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
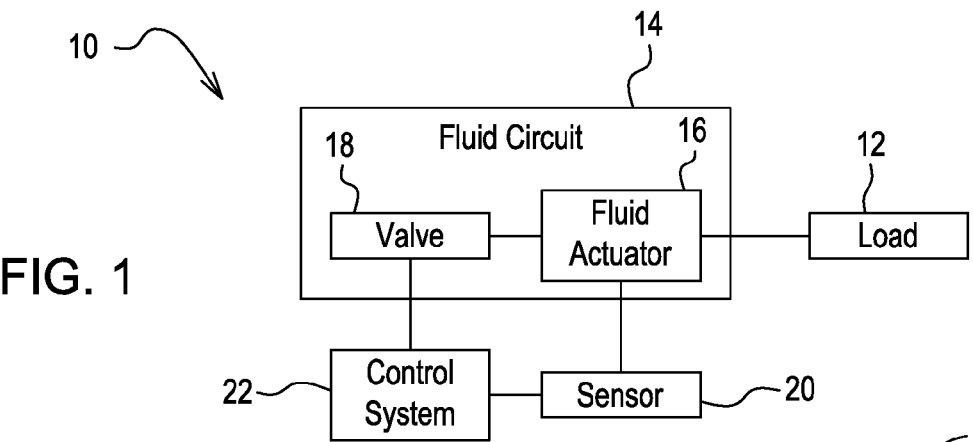
FIG. 1 is a diagrammatic view showing an apparatus with a fluid circuit for controlling operation of a load.

Referring to FIG. 1, an apparatus 10 may be configured in a wide variety of ways. Without limitation, it may be, for example, a machine such as a work machine in the form of, for example, a construction, forestry, or agricultural machine or other type of work machine. To name a non-limiting example, it may be a crawler such as a crawler dozer or a crawler loader.

The apparatus 10 includes a load 12 and a fluid circuit 14 configured to control operation of the load 12. The fluid circuit 14 includes a fluid actuator 16 and a valve 18 coupled fluidly to the fluid actuator 16 and operable to control an operational parameter associated with the fluid actuator 16.

The apparatus 10 includes a sensor 20. The sensor 20 is positioned to sense the operational parameter and to generate a parameter signal indicative of the operational parameter.

The apparatus 10 includes an electronic control system 22. The control system 22 is coupled electrically to the valve 18 and the sensor 20. The control system 22 is configured to output a setpoint control signal to the valve to target that the operational parameter achieve a setpoint, receive the parameter signal, determine if the operational parameter satisfies predetermined threshold standard based at least partially on the setpoint, and, if not, override the setpoint control signal by outputting a dislodgement control signal that is independent of any setpoint for the operational parameter and causes the valve 18 to oscillate between at least a partially opened position and at least a partially closed position to attempt to dislodge and remove contamination that may have collected in the valve 18. The predetermined threshold standard may be if the operational parameter achieves the setpoint within a predetermined period of time. The control system 22 may have an internal timer for tracking such time. The predetermined period of time may be any suitable period of time (e.g., on the order of seconds) determinable without undue experimentation.

If the predetermined threshold standard is not satisfied, the dislodgement control signal may be configured to cause the valve 18 (e.g., a spool of the valve 18) to oscillate between the at least partially opened position and the at least partially closed position one or more times. For example, the dislodgement control signal may cause the valve to oscillate between the at least partially opened position and the at least partially closed position multiple times successively during a cleaning attempt (e.g., three or four times).

The at least partially opened position and the at least partially closed position may be any suitable positions for attempting to dislodge contamination from the valve 18. For example, the at least partially opened position is a maximum opened position of the valve 18, and the at least partially closed position is a maximum closed position of the valve 18. In other examples, the at least partially opened position may be other than the maximum opened position and may vary, and the at least partially closed position may be other than the maximum closed position and may vary.

The load 12 and the fluid circuit 14 may be configured in any suitable way depending on the application. In an example, the load 12 is a cooling fan configured to cool machine fluids, and the fluid circuit 14 is a hydraulic circuit. Such a configuration may be useful with a crawler or other type of work machine to prevent over-heating of the machine. The fluid circuit 14 may be configured as a pneumatic circuit, to name another example.

Figure 2:
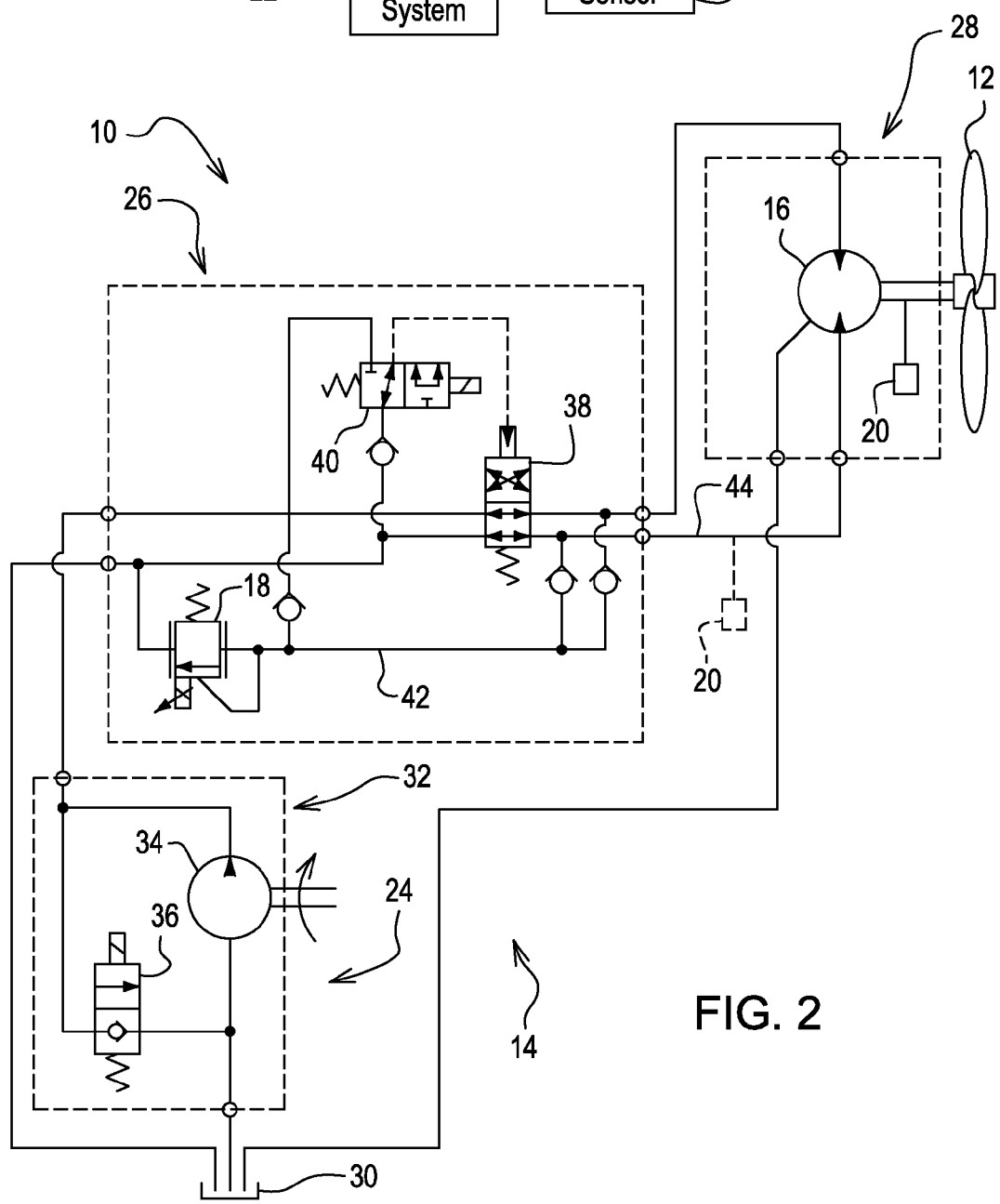
FIG. 2 is a diagrammatic view showing an embodiment of the fluid circuit for bi-directional operation of the load.
Figure 3:
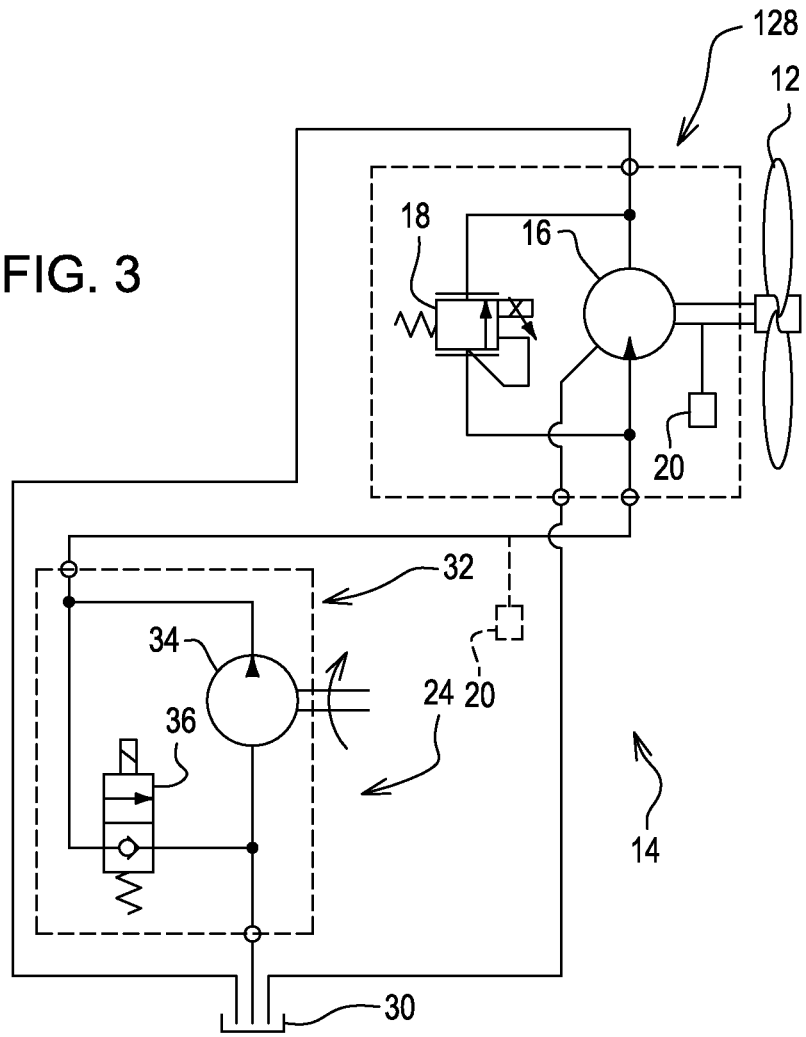
FIG. 3 is a diagrammatic view showing an embodiment of the fluid circuit for uni-directional operation of the load.

The fluid circuit 14 may be configured for bi-directional operation of the load 12, as shown, for example, in FIG. 2, or uni-directional operation of the load 12, as shown, for example, in FIG. 3.

Referring to FIG. 2, there is shown an embodiment of the fluid circuit 14 which is configured for bi-directional operation of the load 12. It is configured, for example, as a hydraulic circuit and has a pressurized-fluid source 24, a valve unit 26, and an actuator unit 28.

The source 24 includes a tank 30 configured to store a working fluid (e.g., hydraulic fluid) and a pump unit 32 configured to pressurize that fluid. The pump unit 32 includes a pump 34 (e.g., hydraulic gear pump) and a start-up valve 36 under the control of the control system 22 and which can be energized by the control system 22 during a cold-machine start.

The valve unit 26 includes a directional control valve 38, a pilot valve 40, and the valve 18. The control valve 38 controls the direction of flow to the actuator 16 and thus the direction of operation of the load 12. The control valve 38 is coupled fluidly to the pilot valve 40 so as to be under the control of the pilot valve 40. The pilot valve 40 is coupled electrically to the control system 22 so as to be under the control of the control system 22.

The valve 18 is configured, for example, as a proportional pressure-relief valve coupled electrically to so as to be under the control of the control system 22. In such a case, the valve 18 is coupled fluidly to a return line 42 of the circuit 14.

The actuator unit 28 includes the actuator 16 and the sensor 20. In the example of FIG. 2, the actuator 16 is bi-directional.

The actuator 16 may be configured in any suitable manner for operating the load 12. For example, the actuator 16 may be a motor or a cylinder. In the example where the load 12 is a cooling fan, the actuator 16 is a motor coupled to the fan to operate the fan.

The operational parameter sensed by the sensor 20 may take a number of forms. For example, the operational parameter may be speed or pressure.

In the case of speed, the sensor 20 may be a speed sensor, shown, for example, in solid line in FIG. 2. In that case, the sensor 20 may be positioned to sense an output speed of the actuator 16. The actuator 16 may be a motor in which case the operational parameter may be an output speed of the motor such as a rotary output speed of an output shaft of the motor. The sensor 20 may be positioned to sense that output speed. The sensor 20 may be integrated into the actuator unit 28, as shown, for example, in FIG. 2, or may be separate from the actuator unit 28. The sensor 20 may take the form of, for example, an encoder (e.g., encoder having a wheel with seven fingers and a pick-up to generate a number of pulses per revolution of the output shaft).

In the case of pressure, the sensor 20 may be a pressure sensor (e.g., pressure transducer), shown, for example, in dotted line in FIG. 2. In that case, the sensor 20 may be positioned to sense pressure in a pressure supply line 44 included in the fluid circuit 14 and leading to the actuator 16 such that the line 44 is coupled fluidly to the actuator 16. As such, the sensor 20 may be coupled fluidly to the pressure supply line 44 to sense pressure associated with the actuator 16, such pressure being indicative of the speed of the actuator 16 (e.g., the output speed of an output shaft of a motor in the case where the actuator 16 is a motor). The pressure sensor may be integrated into the actuator unit 28 or may be separate therefrom as shown, for example, in FIG. 2.

Referring to FIG. 3, there is shown another embodiment of the fluid circuit 14 which is configured for uni-directional operation of the load 12. It is similar to the embodiment of FIG. 2 except that it lacks the valve unit 26 and its reversing capability. As such, the proportional pressure-relief valve 18 is integrated into the actuator unit 28, although it could be separate from the actuator unit 28. The valve 18 is included in a bypass of the actuator 16 so as to control the speed of the actuator 16 in response to control signals from the control system 22.

Figure 4:
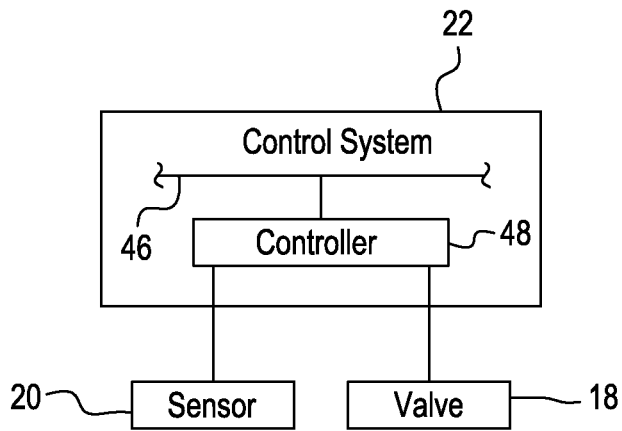
FIG. 4 is a diagrammatic view showing a control system of the apparatus.

Referring to FIG. 4, the control system 22 may include a network of controllers. In such a case, the controllers are connected via a communications bus 46 (e.g., a CAN bus). The controllers include a controller 48 coupled electrically to the bus 46, the sensor 20, and the valve 18.

Figure 5:
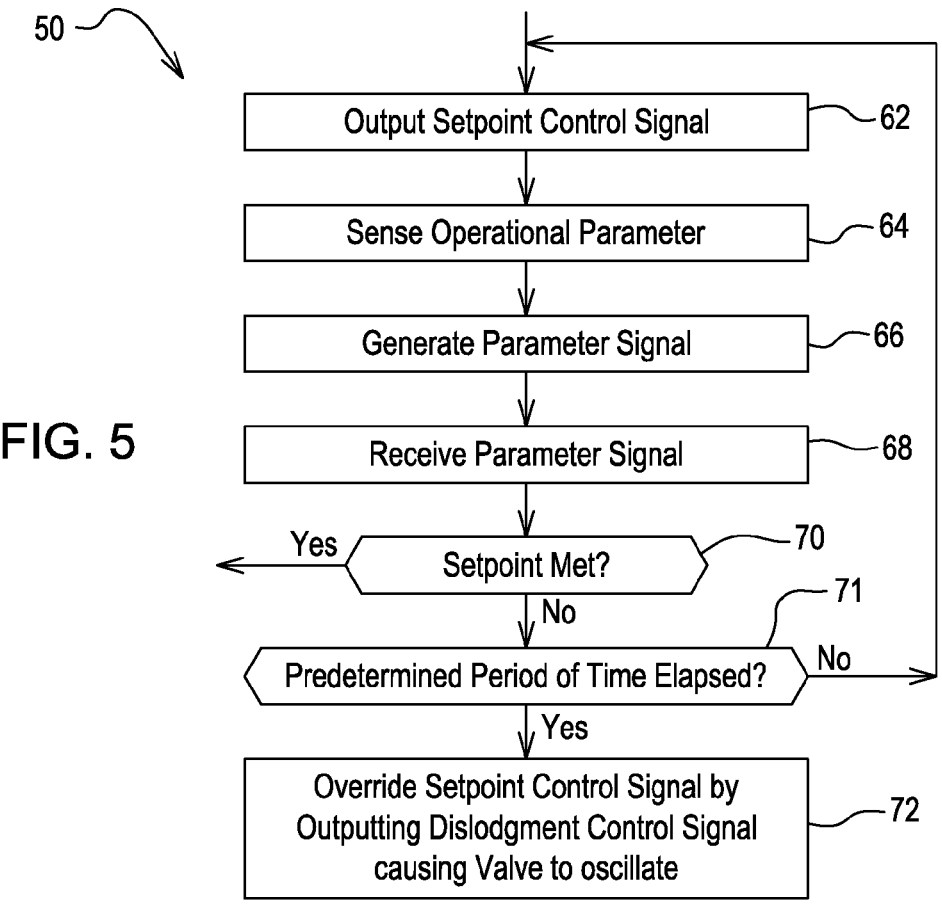
FIG. 5 is a flow chart view showing a control scheme.

Referring to FIG. 5, there is shown an embodiment of a control scheme 50 of the apparatus 10. In step 62, the control system 22 (e.g., the controller 48 thereof) outputs a setpoint control signal to the valve 18. The setpoint control signal targets that the operational parameter associated with the actuator 16 achieve a setpoint. The value of the setpoint may be determined in any suitable manner.

In an example, the setpoint is a desired speed for the actuator 16, and the operational parameter is speed. In such a case, the desired speed may be an output speed for the output shaft of a motor when the actuator 16 is a motor.

In another example, the setpoint is a desired pressure, and the operational parameter is pressure. In such a case, the desired pressure may be the pressure in the pressure supply line 42, such pressure causing the actuator 14 to operate at a speed.

In step 64, the sensor 20 senses the operational parameter. If the operational parameter is speed, the sensor 20 senses the speed, such as the output speed of a motor when the actuator 16 is a motor. If the operational parameter is pressure, the sensor 20 senses pressure, such as the pressure in the pressure supply line 44.

In step 66, the sensor 20 generates a parameter signal indicative of the operational parameter. In step 68, the control system 22 (e.g., the controller 48 thereof) receives the parameter signal.

In steps 70 and 71, the control system 22 (e.g., the controller 48 thereof) determines if the operational parameter satisfies the predetermined threshold standard based at least partially on the setpoint by determining if the operational parameter achieves the setpoint within a predetermined period of time. When the setpoint is a desired speed for the actuator 16, it is determined if the actual speed of the actuator 16 (e.g., the output speed of a motor when the actuator 16 is a motor) meets the desired speed within the predetermined period of time. When the setpoint is a desired pressure (e.g., desired pressure in the pressure supply line 44), it is determined if the actual pressure in the pressure supply line 44 meets the desired pressure within the predetermined period of time.

In step 70, the control system 22 (e.g., the controller 48 thereof) determines if the operational parameter meets the setpoint by comparing the operational parameter (e.g., the actual speed or actual pressure) to the setpoint. If the operational paramemter meets the setpoint, the control system 22 determines effectively that the operational parameter satisfies the predetermined threshold standard, in which case the control system 22 (e.g., the controller 48 thereof) may output the setpoint control signal to control the actuator 16 as desired. If the setpoint is not met, the control scheme 50 advances to step 71.

In step 71, the control system 22 (e.g., the controller 48 thereof) determines if the predetermined period of time has elapsed. If no, the control scheme 50 advances back to step 62 in a loop. If yes, the control scheme 50 determines effectively that the operational parameter does not satisfy the predetermined threshold standard and advances to step 72 on the assumption that contamination may be lodged in the valve 18 causing the valve 18 (e.g., a spool of the valve 18) to stick open, thereby preventing achievement of the setpoint.

The predetermined period of time may be any suitable period of time (e.g., on the order of seconds) determinable without undue experimentation. The control system 22 (e.g., the controller 48 thereof) may have an internal timer for tracking such time.

In step 72, the control system 22 (e.g., the controller 48 thereof) overrides the setpoint control signal by outputting the dislodgement control signal. This causes the valve 18 (e.g., a spool of the valve 18) to oscillate between the at least partially opened and at least partially closed positions. For example, the dislodgement control signal causes the valve 18 to oscillate between the at least partially opened and at least partially closed positions multiple times successively during a cleaning attempt (e.g., three or four times). This may help to dislodge and remove contamination lodged in the valve 18. After oscillating the valve 18, the control scheme 50 may advance back to step 62 to make another attempt at achieving the setpoint.

Figure 6:
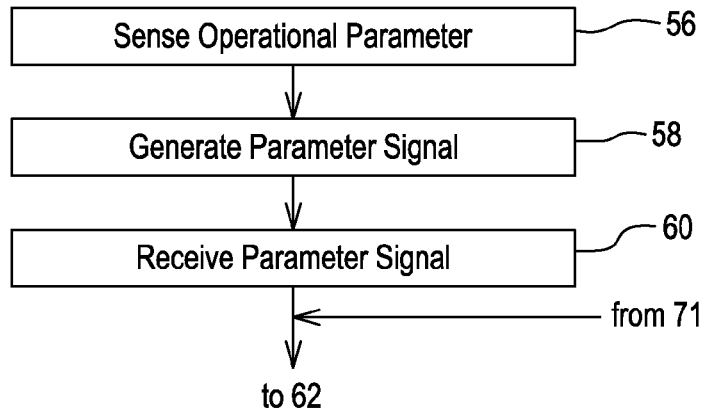
FIG. 6 is a flow chart view showing a variation of the control scheme.

Referring to FIG. 6, there is shown a variation in the control scheme 50. In this variation, the setpoint is a predetermined change in pressure in the pressure supply line 44, such predetermined change in pressure for causing a change in speed of the actuator 16. In such a case, before the setpoint control signal is outputted, an initial pressure is sensed in step 56, the parameter signal is generated in step 58 indicative of that initial pressure, and the parameter signal is received in step 60, as in steps 64, 66, and 68, respectively. With this initial pressure, the control system 22 (e.g., the controller 48 thereof) determines the setpoint control signal based on the change in pressure needed for the actuator 16 to achieve a desired speed, and outputs the setpoint control signal in step 62. The sensor 20 senses the pressure again in step 64 and generates the parameter signal in step 66. In step 68, the control system 22 (e.g., the controller 48 thereof) receives the parameter signal indicative of the second pressure reading.

In steps 70 and 71, the control system 22 (e.g., the controller 48 thereof) determines if the operational parameter satisfies the predetermined threshold standard based at least partially on the setpoint by determining if the operational parameter achieves the setpoint within a predetermined period of time. In step 70, the control system 22 (e.g., the controller 48 thereof) determines if the setpoint is met by calculating an actual pressure difference between the two most recent pressure readings and comparing the actual pressure difference to the setpoint. If the actual pressure difference meets the setpoint, the control system 22 may output the setpoint control signal to control the actuator 16 as desired. If the setpoint is not met, the control scheme 50 advances to step 71 in which the control system 22 (e.g., the controller 48 thereof) determines if the predetermined period of time has elapsed. If no, the control scheme 50 advances back to step 62 in a loop. If yes, the control scheme 50 advances to step 72 to attempt dislodgement and removal of assumed contamination in the valve 18.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An apparatus, comprising
   a fluid circuit comprising a fluid actuator and a valve operable to control an operational parameter associated with the fluid actuator,
   a sensor positioned to sense the operational parameter and to generate a parameter signal indicative of the operational parameter, and
   an electronic control system coupled electrically to the valve and the sensor and configured to
      output a setpoint control signal to the valve to target that the operational parameter achieve a setpoint,
      receive the parameter signal,
      determine if the operational parameter satisfies predetermined threshold standard based at least partially on the setpoint, and
      if not, override the setpoint control signal by outputting a dislodgement control signal that is independent of any setpoint for the operational parameter and causes the valve to oscillate between at least a partially opened position and at least a partially closed position to attempt to dislodge contamination that may have collected in the valve.

2. The apparatus of claim 1, wherein the fluid actuator comprises a motor.

3. The apparatus of claim 2, comprising a fan, wherein the motor is coupled to the fan to operate the fan.

4. The apparatus of claim 1, wherein the valve is a proportional pressure-relief valve.

5. The apparatus of claim 1, wherein the fluid actuator comprises a motor, the operational parameter is an output speed of the motor, and the sensor is a speed sensor.

6. The apparatus of claim 1, wherein the operational parameter is pressure, and the sensor is a pressure sensor.

7. The apparatus of claim 6, comprising a pressure supply line coupled fluidly to the fluid actuator, and the pressure sensor is coupled fluidly to the pressure supply line.

8. The apparatus of claim 1, wherein the control system is configured to determine if the operational parameter achieves the setpoint within a predetermined period of time, and, if not, override the setpoint control signal by outputting the dislodgement control signal.

9. The apparatus of claim 1, wherein the control system is configured to output the dislodgement control signal so as to cause the valve to oscillate between the at least partially opened position and the at least partially closed position multiple times successively during a contamination dislodgement attempt.

10. The apparatus of claim 1, wherein the at least partially opened position is a maximum opened position, and the at least partially closed position is a maximum closed position.

11. A method for use with an apparatus, the apparatus comprising a fluid circuit comprising a fluid actuator and a valve operable to control an operational parameter associated with the fluid actuator, the method comprising
   outputting a setpoint control signal to a valve of the apparatus to target that an operational parameter associated with the fluid actuator achieve a setpoint,
   sensing the operational parameter and generating a parameter signal indicative of the operational parameter,
   receiving the parameter signal,
   determining if the operational parameter satisfies predetermined threshold standard based at least partially on the setpoint, and
   if not, overriding the setpoint control signal by outputting a dislodgement control signal that is independent of any setpoint for the operational parameter and causes the valve to oscillate between at least a partially opened position and at least a partially closed position to attempt to dislodge contamination that may have collected in the valve.

12. The method of claim 11, wherein the fluid actuator comprises a motor, the operational parameter is an output speed of the motor, and the sensing comprises sensing the output speed.

13. The method of claim 11, wherein the operational parameter is pressure, and the sensing comprises sensing the pressure.

14. The method of claim 11, wherein the determining comprises determining if the operational parameter achieves the setpoint within a predetermined period of time.

15. The method of claim 11, wherein the overriding comprises causing the valve to oscillate between the at least partially opened position and the at least partially closed position multiple times successively.

* * * * *